United States Patent
Farivar et al.

(10) Patent No.: US 11,995,545 B2
(45) Date of Patent: *May 28, 2024

(54) TRAINING A NEURAL NETWORK MODEL FOR RECOGNIZING HANDWRITTEN SIGNATURES BASED ON DIFFERENT CURSIVE FONTS AND TRANSFORMATIONS

(71) Applicant: Capital One Services, LLC, McLean, VA (US)

(72) Inventors: Reza Farivar, Champaign, IL (US); Fardin Abdi Taghi Abad, Champaign, IL (US); Anh Truong, Champaign, IL (US); Mark Watson, Urbana, IL (US); Austin Walters, Savoy, IL (US); Jeremy Goodsitt, Champaign, IL (US); Vincent Pham, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/455,692

(22) Filed: Nov. 19, 2021

(65) Prior Publication Data
US 2022/0076254 A1     Mar. 10, 2022

Related U.S. Application Data

(63) Continuation of application No. 16/520,899, filed on Jul. 24, 2019, now Pat. No. 11,195,172.

(51) Int. Cl.
*G06N 3/08* (2023.01)
*G06F 18/24* (2023.01)
(Continued)

(52) U.S. Cl.
CPC ............... *G06N 3/08* (2013.01); *G06F 18/24* (2023.01); *G06Q 20/3825* (2013.01);
(Continued)

(58) Field of Classification Search
None
See application file for complete search history.

(56) References Cited

U.S. PATENT DOCUMENTS

| 3,111,646 A | 11/1963 | Harmon |
| 4,495,644 A | 1/1985 | Parks et al. |
| (Continued) | | |

FOREIGN PATENT DOCUMENTS

| CN | 111008624 A | * | 4/2020 | |
| EP | 3582142 A1 | * | 12/2019 | ........... G06K 9/4628 |
| (Continued) | | | | |

OTHER PUBLICATIONS

Srikanta, Pal. "Multi-Script Off-Line Signature Verification". PhD Doctorate Thesis. Griffith Univ. Queensland, Australia. Oct. 2014. http://hdl.handle.net/10072/366751 (Year: 2014).*
(Continued)

*Primary Examiner* — Ayal I. Sharon
(74) *Attorney, Agent, or Firm* — Harrity & Harrity, LLP

(57) ABSTRACT

A device receives information indicating first names and last names of individuals and applies different cursive fonts to each of the first names and the last names to generate images of different cursive first names and different cursive last names. The device applies different transformations to the images of the different cursive first names and the different cursive last names to generate a set of first name images and a set of last name images. The device combines each first name image with each last name image to form a set of signature images and trains a neural network model, with the set of signature images, to generate a trained neural network model. The device receives an image of a signature and processes the image of the signature, with the trained neural network model, to recognize a first name and a last name in the signature.

20 Claims, 12 Drawing Sheets

(51) Int. Cl.
| | | |
|---|---|---|
| *G06Q 20/38* | (2012.01) | |
| *G06V 10/82* | (2022.01) | |
| *G06V 30/19* | (2022.01) | |
| *G06V 30/226* | (2022.01) | |
| *G06V 40/30* | (2022.01) | |
| *G06N 3/04* | (2023.01) | |

(52) U.S. Cl.
CPC ........ *G06V 10/82* (2022.01); *G06V 30/19147* (2022.01); *G06V 30/19173* (2022.01); *G06V 30/226* (2022.01); *G06V 40/33* (2022.01); *G06N 3/04* (2013.01)

(56) References Cited

U.S. PATENT DOCUMENTS

| | | | | |
|---|---|---|---|---|
| 5,111,512 | A * | 5/1992 | Fan | G07C 9/35 |
| | | | | 382/177 |
| 5,319,722 | A * | 6/1994 | Oki | G06V 30/146 |
| | | | | 382/293 |
| 5,442,715 | A | 8/1995 | Gaborski et al. | |
| 5,647,017 | A | 7/1997 | Smithies et al. | |
| 5,812,698 | A | 9/1998 | Platt et al. | |
| 5,892,824 | A | 4/1999 | Beatson et al. | |
| 6,160,914 | A | 12/2000 | Muroya | |
| 6,430,305 | B1 | 8/2002 | Decker | |
| 6,661,908 | B1 | 12/2003 | Suchard et al. | |
| 6,850,252 | B1 | 2/2005 | Hoffberg | |
| 7,010,147 | B2 | 3/2006 | Silverbrook et al. | |
| 7,181,017 | B1 | 2/2007 | Nagel et al. | |
| 7,624,277 | B1 * | 11/2009 | Simard | H04L 63/14 |
| | | | | 704/270 |
| 8,738,354 | B2 | 5/2014 | Platt et al. | |
| 10,386,481 | B1 | 8/2019 | Chen et al. | |
| 10,891,463 | B2 * | 1/2021 | Osiecki | G06V 30/19067 |
| 11,074,495 | B2 * | 7/2021 | Zadeh | G06F 18/2413 |
| 11,195,172 | B2 | 12/2021 | Farivar et al. | |
| 11,205,063 | B2 * | 12/2021 | Hong | G06V 40/382 |
| 2002/0010679 | A1 | 1/2002 | Felsher | |
| 2002/0069358 | A1 | 6/2002 | Silvester | |
| 2002/0161763 | A1 | 10/2002 | Ye et al. | |
| 2003/0084002 | A1 | 5/2003 | Ericson et al. | |
| 2003/0182585 | A1 | 9/2003 | Murase et al. | |
| 2004/0015688 | A1 | 1/2004 | Yu Zhang et al. | |
| 2004/0148577 | A1 | 7/2004 | Xu et al. | |
| 2008/0156866 | A1 | 7/2008 | McNeal | |
| 2008/0159589 | A1 | 7/2008 | Benyoub | |
| 2008/0191016 | A1 | 8/2008 | Lapstun et al. | |
| 2009/0100269 | A1 | 4/2009 | Naccache | |
| 2010/0067793 | A1 | 3/2010 | Serrano et al. | |
| 2010/0084468 | A1 | 4/2010 | Lapstun | |
| 2010/0184408 | A1 | 7/2010 | Vendrow et al. | |
| 2010/0241595 | A1 | 9/2010 | Felsher | |
| 2010/0317420 | A1 | 12/2010 | Hoffberg | |
| 2011/0000961 | A1 | 1/2011 | McNeal | |
| 2011/0050394 | A1 | 3/2011 | Zhang et al. | |
| 2011/0185266 | A1 | 7/2011 | Lapstun et al. | |
| 2011/0238510 | A1 | 9/2011 | Rowen et al. | |
| 2012/0033874 | A1 | 2/2012 | Perronnin et al. | |
| 2013/0047268 | A1 | 2/2013 | Arat | |
| 2014/0201126 | A1 | 7/2014 | Zadeh et al. | |
| 2014/0254896 | A1 | 9/2014 | Zhou et al. | |
| 2015/0222437 | A1 | 8/2015 | Gertner | |
| 2015/0312041 | A1 | 10/2015 | Choi | |
| 2015/0347836 | A1 | 12/2015 | Shustorovich et al. | |
| 2016/0004422 | A1 * | 1/2016 | Cohen | G06F 21/32 |
| | | | | 382/119 |
| 2016/0328366 | A1 | 11/2016 | Elarian | |
| 2016/0328620 | A1 | 11/2016 | Elarian | |
| 2017/0011340 | A1 | 1/2017 | Gabbai | |
| 2017/0046560 | A1 | 2/2017 | Tsur | |
| 2017/0048406 | A1 * | 2/2017 | Lea | H04N 1/00724 |
| 2017/0154341 | A1 | 6/2017 | Gilbertson | |
| 2017/0316287 | A1 | 11/2017 | Mu et al. | |
| 2018/0018451 | A1 | 1/2018 | Spizhevoy et al. | |
| 2018/0103036 | A1 * | 4/2018 | Fox | F42B 12/44 |
| 2018/0121961 | A1 | 5/2018 | Villanueva | |
| 2018/0143948 | A1 * | 5/2018 | Bartkiewicz | H04L 63/126 |
| 2018/0157916 | A1 | 6/2018 | Doumbouya et al. | |
| 2018/0157939 | A1 | 6/2018 | Butt et al. | |
| 2018/0204111 | A1 * | 7/2018 | Zadeh | G06V 10/764 |
| 2018/0239959 | A1 | 8/2018 | Bui et al. | |
| 2018/0307942 | A1 * | 10/2018 | Pereira | G06T 7/337 |
| 2018/0351941 | A1 * | 12/2018 | Chhabra | H04L 9/38 |
| 2019/0043508 | A1 | 2/2019 | Sak et al. | |
| 2019/0130202 | A1 | 5/2019 | Doumbouya et al. | |
| 2019/0171885 | A1 | 6/2019 | Chau et al. | |
| 2019/0258820 | A1 | 8/2019 | Gaspar et al. | |
| 2019/0384901 | A1 | 12/2019 | Osborn et al. | |
| 2020/0110862 | A1 | 4/2020 | Derakhshani et al. | |
| 2020/0143143 | A1 * | 5/2020 | Osiecki | G06V 30/347 |
| 2020/0372662 | A1 * | 11/2020 | Pereira | G06T 7/60 |
| 2021/0312679 | A1 * | 10/2021 | Ekstrand | G06T 11/60 |
| 2023/0084845 | A1 * | 3/2023 | Lu | G06V 30/413 |

FOREIGN PATENT DOCUMENTS

| | | | | |
|---|---|---|---|---|
| EP | 2996360 B1 * | 11/2020 | | G06K 9/00181 |
| WO | WO-2023038722 A1 * | 3/2023 | | G06F 40/284 |

OTHER PUBLICATIONS

Hangai S., et al., "A Comparison of Three Kinds of DP Matching Schemes in Verifying Segmental Signatures", Proceeding of Bioi D_MultiComm, Sep. 16-18, 2009, pp. 333-339, ISBN: 3-642-04390-9 978-3-642-04390-1. (Year: 2009).*

From Wikipedia, the free encyclopedia. "Hough transform". Jul. 21, 2019. https://en.wikipedia.org/w/index.php?title=Hough_transform&oldid=907255250 (Year: 2019).*

Batista L., et al., "State of the Art in Off-Line Signature Verification," Chapter III. Pattern Recognition Technologies and Applications: Recent Advances, Jun. 30, 2008.

Bromley J., et al., "Signature Verification using a 'Siamese' Time Delay Neural Network", Copyright 1994, American Telephone and Telegraph Company, 8 pages.

Chauhan P., et al., "Static Digital Signature Recognition and Verification using Neural Networks", 1st India International Conference on Information Processing (IICIP), 2016, Aug. 1, 2016, 6 pages.

Coursera, "Deep Learning Specialization", Apr. 14, 2018, 15 pages, Retrieved from [URL: https://www.coursera.org/specializations/deep-learning].

Dictionary.com., "Cursive", Printed Sep. 22, 2019, Includes Collins English Dictionary Definition, 2012, 5 pages, Retrieved from the internet [URL: https://www.dictionary.com/browse/cursive?s=t].

Hangai S., et al., "A Comparison of Three Kinds of DP Matching Schemes in Verifying Segmental Signatures", Proceeding of Bioi D_MultiComm, Sep. 16-18, 2009, pp. 333-339, ISBN: 3-642-04390-9 978-3-642-04390-1.

Marinai S., et al., "Artificial Neural Networks for Document Analysis and Recognition", IEEE Transactions on Pattern Analysis and Machine Intelligence, Jan. 1, 2005, vol. 27 (1), pp. 23-35.

Pacut A., et al., "Recognition of Human Signatures", Warsaw University of Technology, Poland, Copyright 2001, IEEE, pp. 1560-1564.

Pal S., et al., "Multi-Script Off-Line Signature Verification", Ph.D Doctorate Thesis, Griffith University Queensland, Australia, Oct. 2014, Retrieved from the internet [URL: http://hdl.handle.net/10072/366751].

Rahman M.A et al., "Writer-independent Offline Handwritten Signature Verification using Novel Feature Extraction Techniques," International Journal of Computer Applications (0975-8887). vol. 177, No. 14, Oct. 2019.

Rivard D., et al., "Multi-Feature Approach for Writer-Independent Offline Signature Verification," Master's Thesis, University of Quebec. Oct. 10, 2010. https://espace.etsmtl.ca/id/eprint/658/1/RIVARD_Dorninique.pdf.

Rosso O.A., et al., "Classification and Verification of Handwritten Signatures with Time Causal Information Theory Quantifiers," PLoS ONE 11 (12): e0166868.

(56) References Cited

OTHER PUBLICATIONS

Tayeb S., et al., "Toward Data Quality Analytics in Signature Verification Using a Convolutional Neural Network", 2017 IEEE International Conference on Big Data, Dec. 1, 2017, pp. 2644-2651.
Wikipedia., "Deep Learning", Jul. 21, 2019, Retrieved from the internet [URL: https://en.wikipedia.org/w/index.php?title=Deep_learning&oldid=907224000].
Wilkinson T.S., et al., "Use of Synthetic Discriminant Functions for Handwritten Signature Verification", Applied Optics, Aug. 10, 1991, vol. 30 (23), 9 pages.
Zhu G., et al., "Signature Detection and Matching for Document Image Retrieval", IEEE Transactions on Pattern Analysis and Machine Intelligence, Nov. 1, 2009, vol. 31 (11), pp. 2015-2031.

\* cited by examiner

TRAINING A NEURAL NETWORK MODEL FOR RECOGNIZING HANDWRITTEN SIGNATURES BASED ON DIFFERENT CURSIVE FONTS AND TRANSFORMATIONS

RELATED APPLICATION

This application is a continuation of U.S. patent application Ser. No. 16/520,899, filed Jul. 24, 2019 (now U.S. Pat. No. 11,195,172), which is incorporated herein by reference in its entirety.

BACKGROUND

Optical character recognition (OCR) is an electronic conversion of images of typed, handwritten, or printed text into machine-encoded text. OCR is widely used as a form of information entry from printed paper data records (e.g., passport documents, invoices, bank statements, computerized receipts, business cards, mail, and/or the like). OCR is a common method of digitizing printed text so that the text may be electronically edited, searched, stored more compactly, displayed on-line, used in machine processes (e.g., cognitive computing, machine translation, text-to-speech, text mining, etc.), and/or the like.

SUMMARY

According to some implementations, a method may include receiving information indicating first names and last names of individuals and applying different cursive fonts to each of the first names and to each of the last names to generate images of different cursive first names and different cursive last names. The method may include applying different transformations to the images of the different cursive first names to generate a set of first name images and applying the different transformations to the images of the different cursive last names to generate a set of last name images. The method may include combining each first name image of the set of first name images with each last name image of the set of last name images to form a set of signature images, wherein each signature image of the set of signature images may include one first name image of the set of first name images, and one last name image of the set of last name images. The method may include training a neural network model, with the set of signature images, to generate a trained neural network model and receiving an image of a signature. The method may include processing the image of the signature, with the trained neural network model, to recognize a first name and a last name in the signature.

According to some implementations, a device may include one or more memories and one or more processors, communicatively coupled to the one or more memories, to apply different cursive fonts to each first name, of a plurality of first names, and to each second name, of a plurality of second names, to generate images of different cursive first names and different cursive second names. The one or more processors may apply different transformations to the images of the different cursive first names to generate a set of first name images and may apply the different transformations to the images of the different cursive second names to generate a set of second name images. The one or more processors may combine each first name image of the set of first name images with each second name image of the set of second name images to form a set of full name images, wherein each full name image of the set of full name images may include one first name image of the set of first name images, and one second name image of the set of second name images. The one or more processors may train a neural network model, with the set of full name images, to generate a trained neural network model and may process an image of a signature, with the trained neural network model, to recognize a first name and a last name in the signature. The one or more processors may perform one or more actions based on recognizing the first name and the last name in the signature.

According to some implementations, a non-transitory computer-readable medium may store instructions that include one or more instructions that, when executed by one or more processors of a device, cause the one or more processors to receive a neural network model trained to recognize a first name and a second name from a handwritten signature. The neural network model may have been trained by applying different cursive fonts to each first name, of a plurality of first names, and to each second name, of a plurality of second names, to generate images of different cursive first names and images of different cursive second names, applying different transformations to the images of the different cursive first names to generate a set of first name images, applying the different transformations to the images of the different cursive second names to generate a set of second name images, combining each first name image of the set of first name images with each second name image of the set of second name images to form a set of full name images, wherein each full name image of the set of full name images includes one first name image of the set of first name images and one second name image of the set of second name images, and training the neural network model with the set of full name images. The one or more instructions may cause the one or more processors to receive an image of the handwritten signature and process the image of the handwritten signature, with the neural network model, to recognize the first name and the last name in the handwritten signature. The one or more instructions may cause the one or more processors to perform one or more actions based on recognizing the first name and the last name in the handwritten signature.

DETAILED DESCRIPTION

The following detailed description of example implementations refers to the accompanying drawings. The same reference numbers in different drawings may identify the same or similar elements.

Recognizing handwritten signatures may be essential for certain entities (e.g., financial companies, security companies, and/or the like). However, OCR systems have an extremely difficult time recognizing handwritten signatures since handwritten signatures are stylized for each person, which makes characters or names in handwritten signatures unrecognizable to OCR systems.

Some implementations described herein provide a recognition platform that trains a neural network model for recognizing handwritten signatures based on different cursive fonts and transformations. For example, the recognition platform may receive information indicating first names and last names of individuals and may apply different cursive fonts to each of the first names and to each of the last names to generate images of different cursive first names and different cursive last names. The recognition platform may apply different transformations to the images of the different cursive first names to generate a set of first name images and may apply the different transformations to the images of the different cursive last names to generate a set of last name images. The recognition platform may combine each first name image of the set of first name images with each last name image of the set of last name images to form a set of signature images, wherein each signature image of the set of signature images may include one first name image of the set of first name images, and one last name image of the set of last name images. The recognition platform may train a neural network model, with the set of signature images, to generate a trained neural network model and may receive an image of a signature. The recognition platform may process the image of the signature, with the trained neural network model, to recognize a first name and a last name in the signature.

In this way, the recognition platform generates hundreds of millions of synthesized signature images that are used to train a deep learning image classifier neural network model (or different types of neural network models), which increases the accuracy of the image classifier neural network model. The recognition platform also generates an image classifier neural network model that more accurately recognizes a first name and a last name in an image of signature, which conserves resources that would otherwise be wasted in attempting to verify credentials of a user associated with the image of the signature.

Figure 1A:
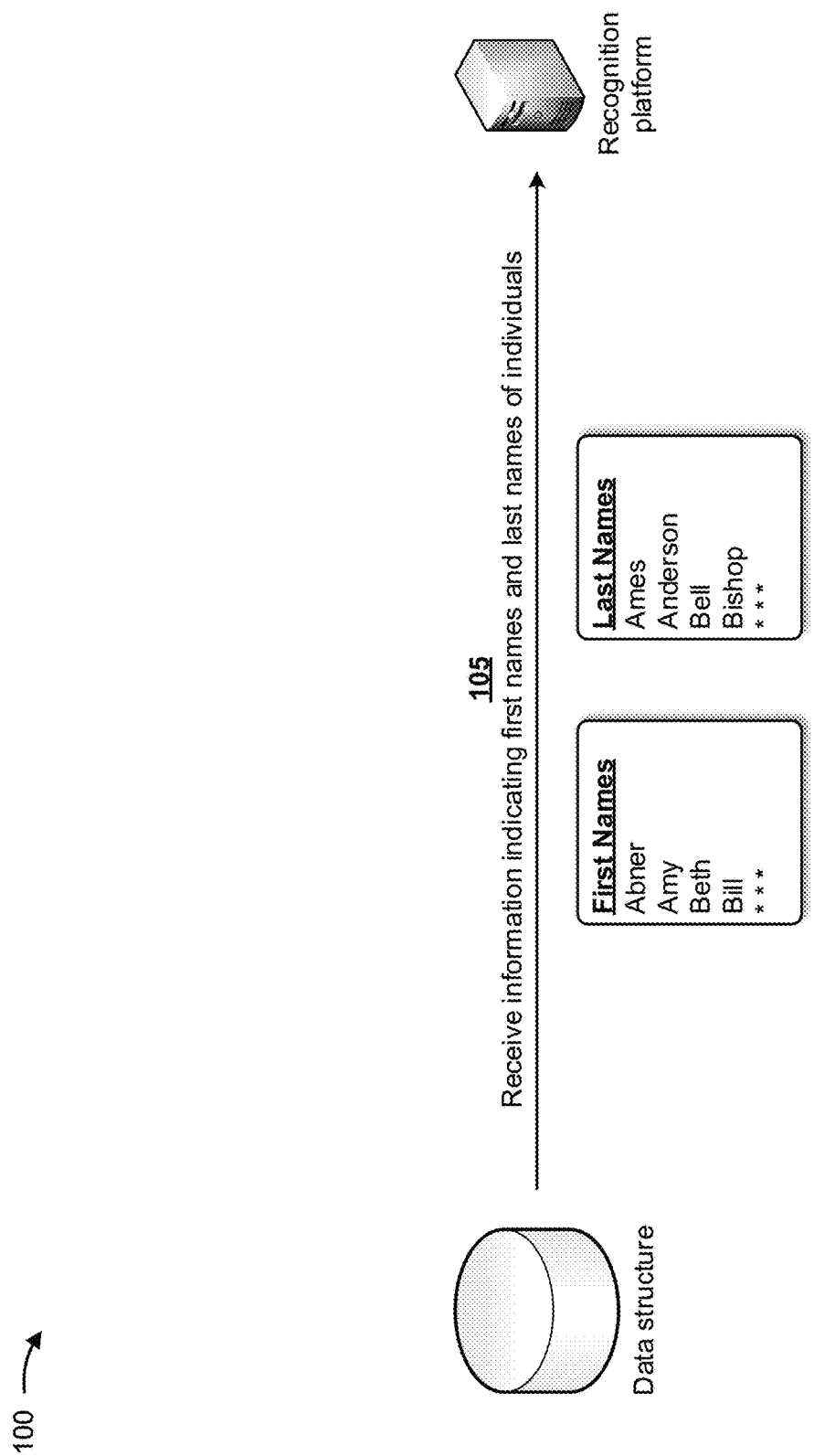
FIGS. 1A-1G are diagrams of an example implementation described herein.

FIGS. 1A-1G are diagrams of an example implementation 100 described herein. As shown in FIG. 1A, a data structure (e.g., a database, a table, a list, and/or the like) may be associated with a recognition platform. As further shown in FIG. 1A, and by reference number 105, the recognition platform may receive, from the data structure, information indicating first names and last names of individuals. In some implementations, the information indicating the first names and the last names of individuals may include information identifying as many different types of first names utilized by individuals, information identifying as many different types of last names utilized by individuals, and/or the like. In some implementations, the information indicating the first names and the last names of individuals may be provided in a non-cursive or printed font. In some implementations, the information may include middle names and/or middle initials of the individuals.

Figure 1B:
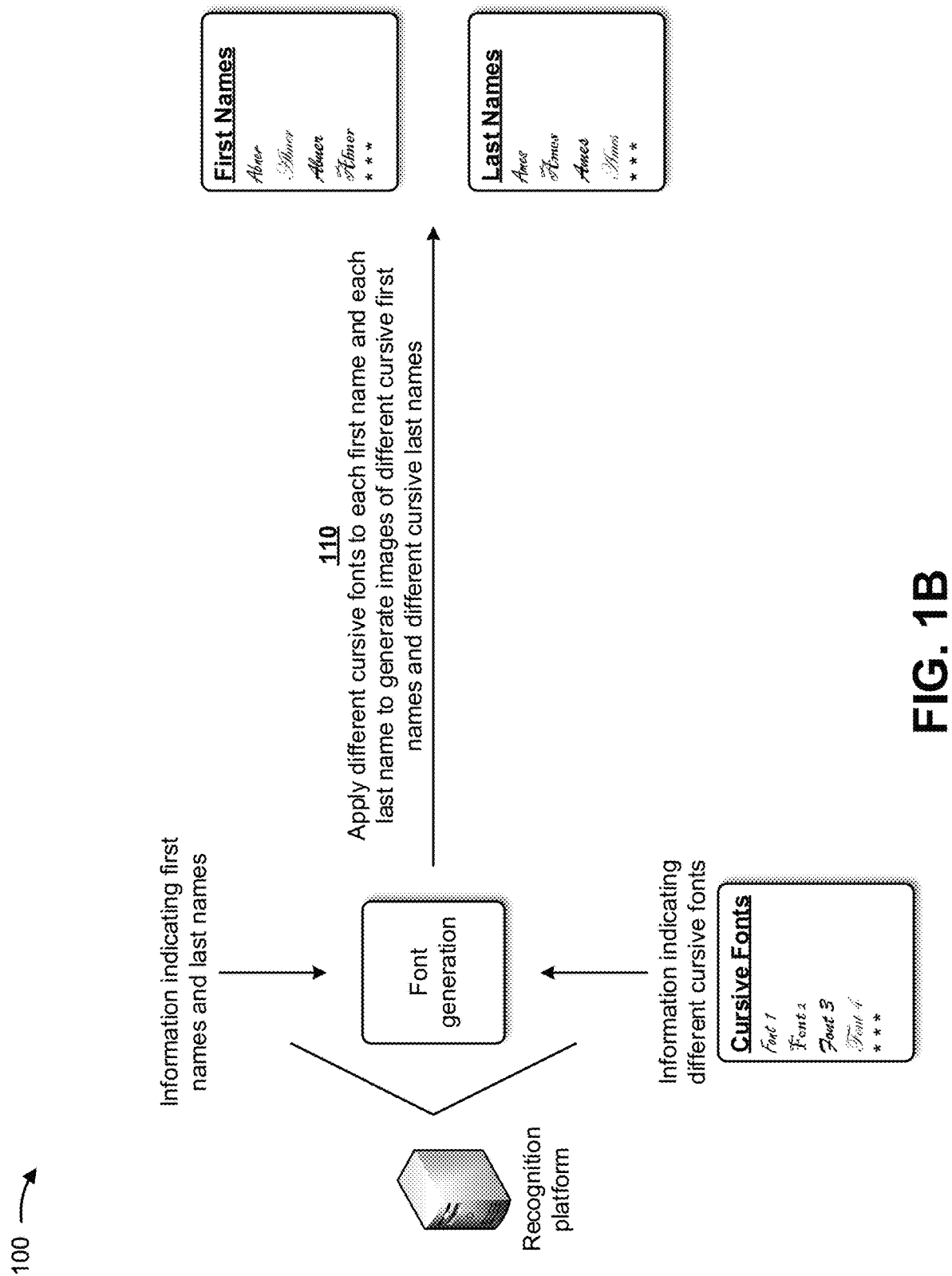

With reference to FIG. 1B, the recognition platform may receive (e.g., from the data structure) information indicating a plurality of different cursive fonts. In some implementations, the information indicating different cursive fonts may include information identifying a brush script font, an Edwardian script font, a freestyle script font, a French script font, a Gigi font, a Kunstler script font, a *Lucida* handwriting font, a magneto bold font, a mistral font, a palace script font, a rage italic font, a script MT bold font, a Segoe script font, a Viner hand font a Vivaldi font, a Vladimir script font, an American scribe font, a Coronet font, a declaration font, a declare font, and/or the like.

As further shown in FIG. 1B, and by reference number 110, the recognition platform may apply the different cursive fonts to each first name and each last name, in the information indicating the first names and the last names of individuals, to generate images of different cursive first names and different cursive last names. For example, if a first name is "Abner," the recognition platform may create a first image of the first name "Abner" in the brush script font, a second image of the first name "Abner" in the Edwardian script font, a third image of the first name "Abner" in the freestyle script font, and/or the like. In another example, if a last name is "Ames," the recognition platform may create a first image of the last name "Ames" in the brush script font, a second image of the last name "Ames" in the Edwardian script font, a third image of the last name "Ames" in the freestyle script font, and/or the like. In some implementations, the recognition platform may store the images of different cursive first names and different cursive last names in the data structure associated with the recognition platform.

Figure 1C:
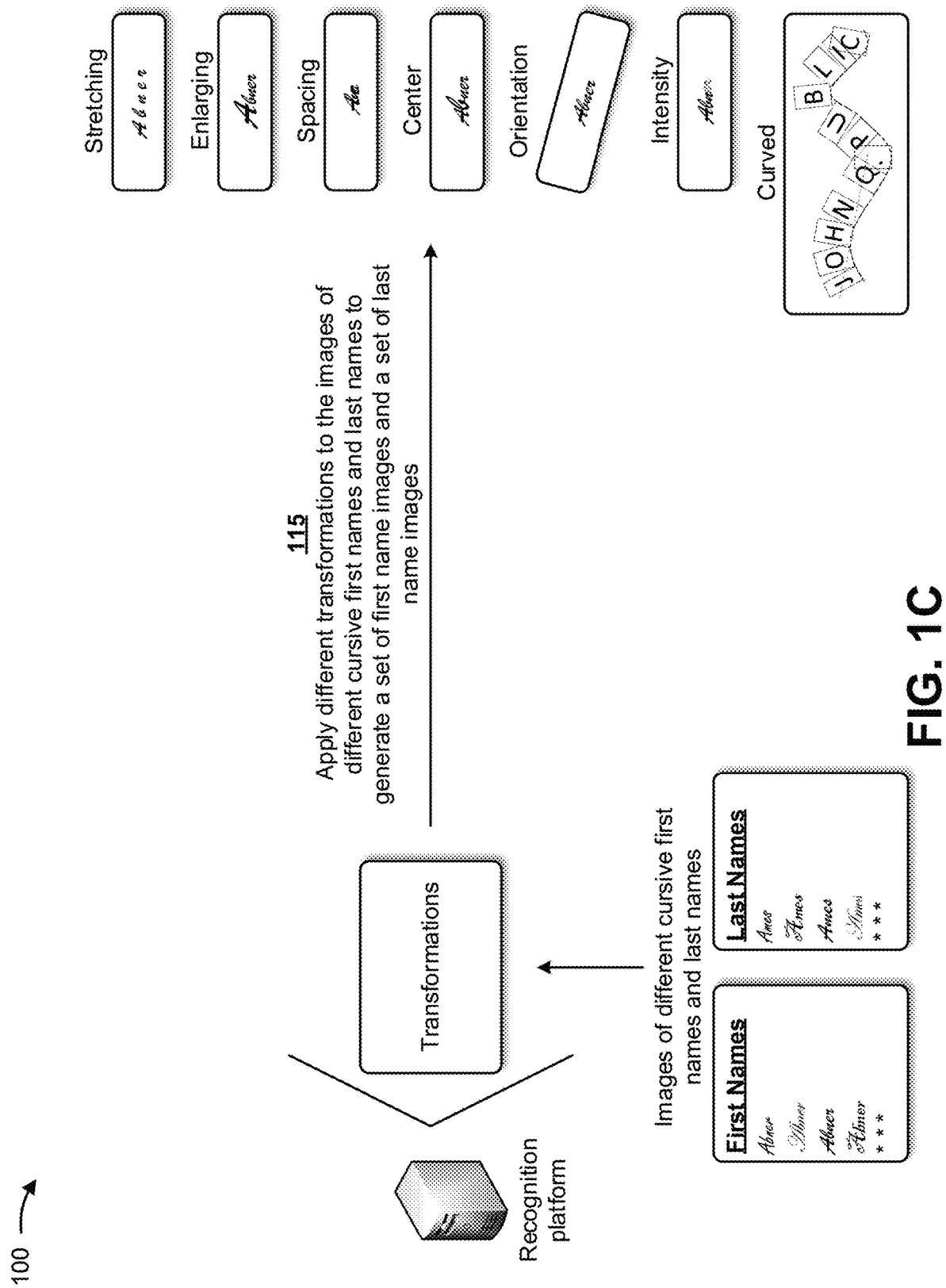

As shown in FIG. 1C, and by reference number 115, the recognition platform may apply different transformations to the images of different cursive first names and last names to generate a set of first name images (e.g., a set of images of transformed first names) and a set of last name images (e.g., a set of images of transformed last names). In some implementations, the different transformations may include stretching a cursive image of a first name/last name in either or both directions (e.g., to the left and/or to the right), stretching one or more characters of the first name/last name in the cursive image of the first name/last name in either or both directions, enlarging a first character of the first name/last name in the cursive image of the first name/last name (e.g., more than remaining characters of the first name/last name), enlarging a first two characters of the first name/last name in the cursive image of the first name/last name (e.g., a trapezoid in which the characters of the first name/last name get increasing smaller from left to right), changing a spacing between characters of the first name/last name in the cursive image of the first name/last name (e.g., so that two or more characters overlap), moving centers of characters of the first name/last name in the cursive image of the first name/last name so that the characters do not adhere to a straight line, changing an orientation (e.g., based on an angle of rotation) of the cursive image of the first name/last name, changing an intensity of one or more last characters of the first name/last name in the cursive image of the first name/last name so that the characters mimic a fading signature (e.g., provided by a pen, a pencil, and/or the like), omitting one or more characters of the first name/last name in the cursive image of the first name/last name, mix different fonts with a same first name/last name, mimic a broken or partial signature with the first name/last name, and/or the like.

In some implementations, the different transformations may include when characters follow a curve rather than a straight line. The curve may be created synthetically following an exponentially decayed sinusoidal curve. Alternatively, or additionally, a neural network model may be trained on a set of real handwritten signatures to learn how much variation typical signatures have from a straight line. The recognition platform may utilize output from the neural network model to generate the curve. Once the curve is generated, each character's midpoint of a bounding box (e.g., on a lower edge) may be aligned with a tangent of the curve at the midpoint (e.g., a tangent line for the character "H").

Figure 1D:
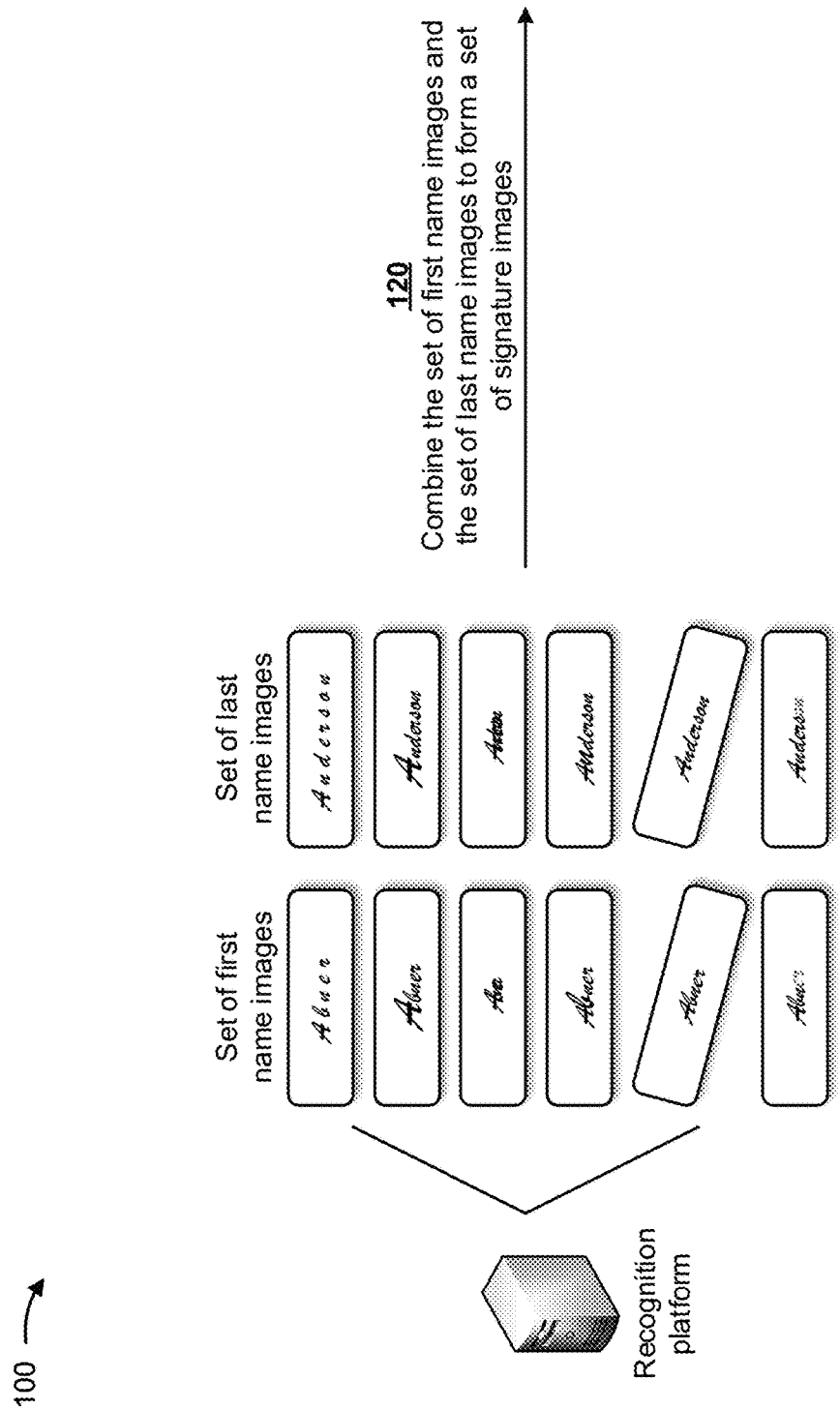

As shown in FIG. 1D, and by reference number 120, the recognition platform may combine the set of first name images and the set of last name images to form a set of signature images. In some implementations, the recognition platform may combine each first name image of the set of first name images with each last name image of the set of last name images to form the set of signature images. In some implementations, each signature image of the set of signature images may include one first name image of the set of first name images and one last name image of the set of last name images. For example, as further shown in FIG. 1D, if the set of first name images includes fifty different images for the first name "Abner" and the set of last name images includes fifty different images for the last name "Anderson," the recognition platform may combine these images to generate two-thousand and five-hundred (e.g., 50×50=2, 500) signature images for the name "Abner Anderson."

Figure 1E:
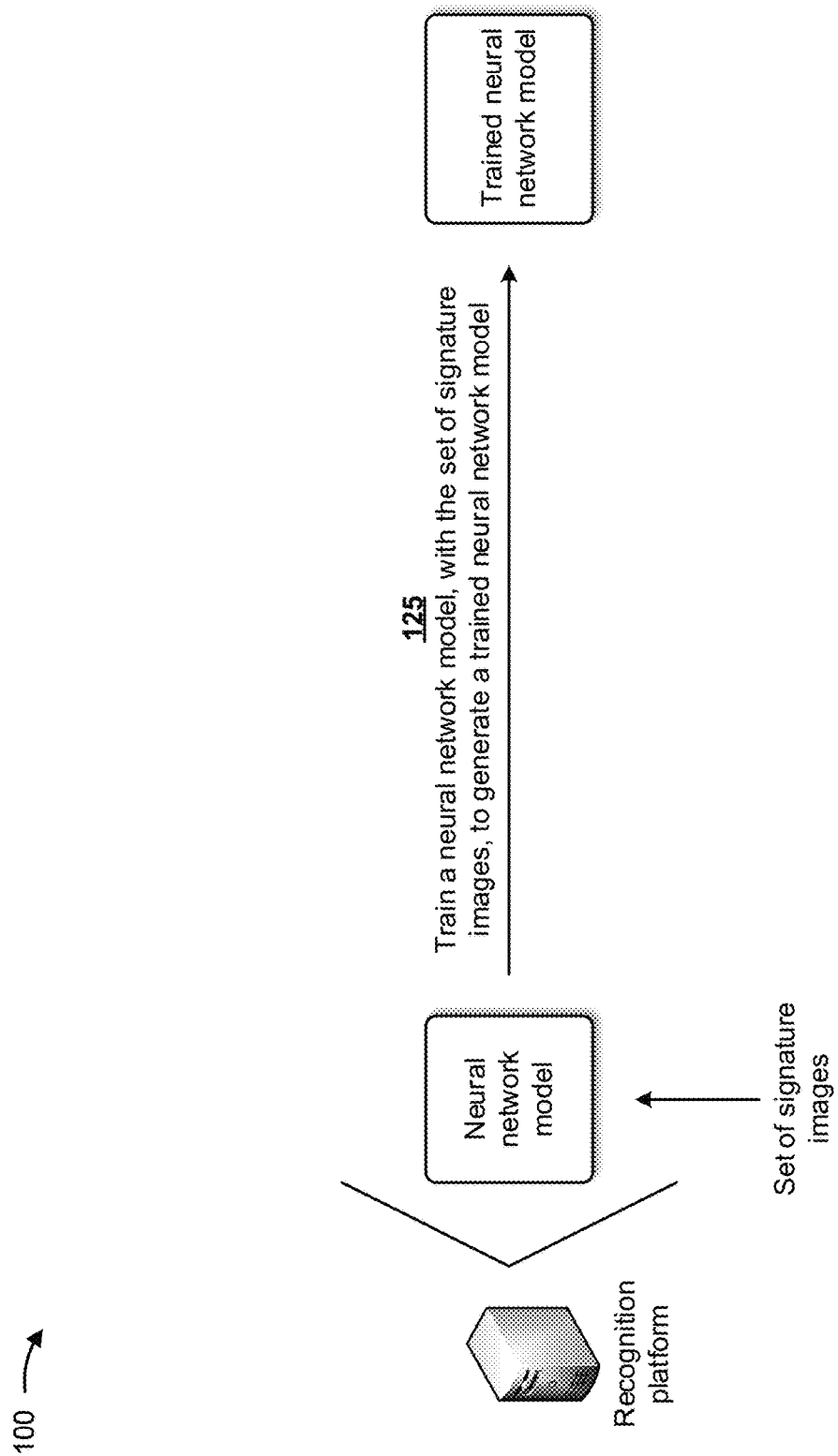

As shown in FIG. 1E, and by reference number 125, the recognition platform may train a neural network model, with the set of signature images, in order to generate a trained neural network model. In some implementations, the neural network model may include a deep learning image classifier neural network model that identifies a first name and a last name in an image of a signature. In some implementations, the neural network model may include one or more of a feedforward neural network model, a radial basis function neural network model, a Kohonen self-organizing neural network model, a recurrent neural network (RNN) model, a convolutional neural network model, a modular neural network model, and/or the like.

In some implementations, the recognition platform may perform a training operation on the neural network model, with the set of signature images. The recognition platform may separate the set of signature images into a training set, a validation set, a test set, and/or the like. The training set may be utilized to train the neural network model. The validation set may be utilized to validate results of the trained neural network model. The test set may be utilized to test operations of the neural network model. In some implementations, the recognition platform may train the neural network model using, for example, an unsupervised training procedure and based on the set of signature images. For example, the recognition platform may perform dimensionality reduction to reduce the set of signature images to a minimum feature set, thereby reducing resources (e.g., processing resources, memory resources, and/or the like) to train the neural network model and may apply a classification technique to the minimum feature set.

In some implementations, the recognition platform may use a logistic regression classification technique to determine a categorical outcome (e.g., identification of a first name and a last name in an image of a signature). Additionally, or alternatively, the recognition platform may use a naïve Bayesian classifier technique. In this case, the recognition platform may perform binary recursive partitioning to split the set of signature images into partitions and/or branches and use the partitions and/or branches to perform predictions (e.g., identification of a first name and a last name in an image of a signature). Based on using recursive partitioning, the recognition platform may reduce utilization of computing resources relative to manual, linear sorting and analysis of data points, thereby enabling use of thousands, millions, or billions of data points to train the neural network model, which may result in a more accurate model than using fewer data points.

Additionally, or alternatively, the recognition platform may use a support vector machine (SVM) classifier technique to generate a non-linear boundary between data points in the training set. In this case, the non-linear boundary is used to classify test data into a particular class.

Additionally, or alternatively, the recognition platform may train the neural network model using a supervised training procedure that includes receiving input to the neural network model from a subject matter expert, which may reduce an amount of time, an amount of processing resources, and/or the like to train the neural network model relative to an unsupervised training procedure. In some implementations, the recognition platform may use one or more other model training techniques, such as a neural network technique, a latent semantic indexing technique, and/or the like. For example, the recognition platform may perform an artificial neural network processing technique (e.g., using a two-layer feedforward neural network architecture, a three-layer feedforward neural network architecture, and/or the like) to perform pattern recognition with regard to patterns of the set of signature images. In this case, using the artificial neural network processing technique may improve an accuracy of the trained neural network model generated by the recognition platform by being more robust to noisy, imprecise, or incomplete data, and by enabling the recognition platform to detect patterns and/or trends undetectable to human analysts or systems using less complex techniques.

Figure 1F:
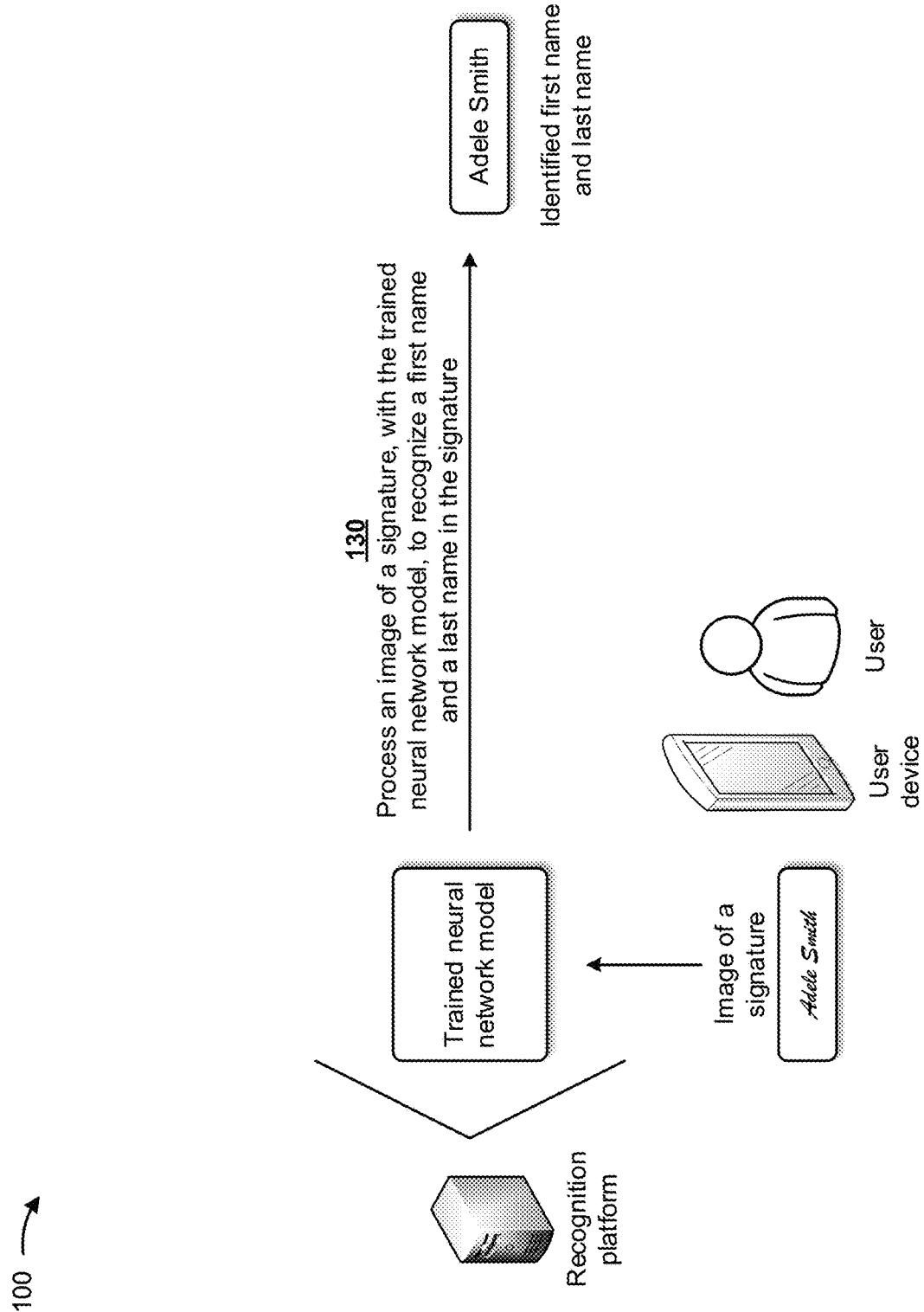

As shown in FIG. 1F, a user device may be associated with a user and the recognition platform. The user may cause the user device to provide, to the recognition platform, an image of a signature (e.g., with a name "Adele Smith"). For example, the user may be providing the image of the signature to verify that the user is authorized to conduct a transaction (e.g., a financial transaction, a real estate transaction, and/or the like).

As further shown in FIG. 1F, and by reference number 130, the recognition platform may process the image of the signature, with the trained neural network model, to recognize the first name and the last name in the signature. For example, the trained neural network model may determine that the first name in the signature is "Adele" and the last name in the signature is "Smith." In some implementations, the recognition platform may utilize the identified first name and last name (e.g., "Adele Smith") to authorize the user to conduct the transaction.

Figure 1G:
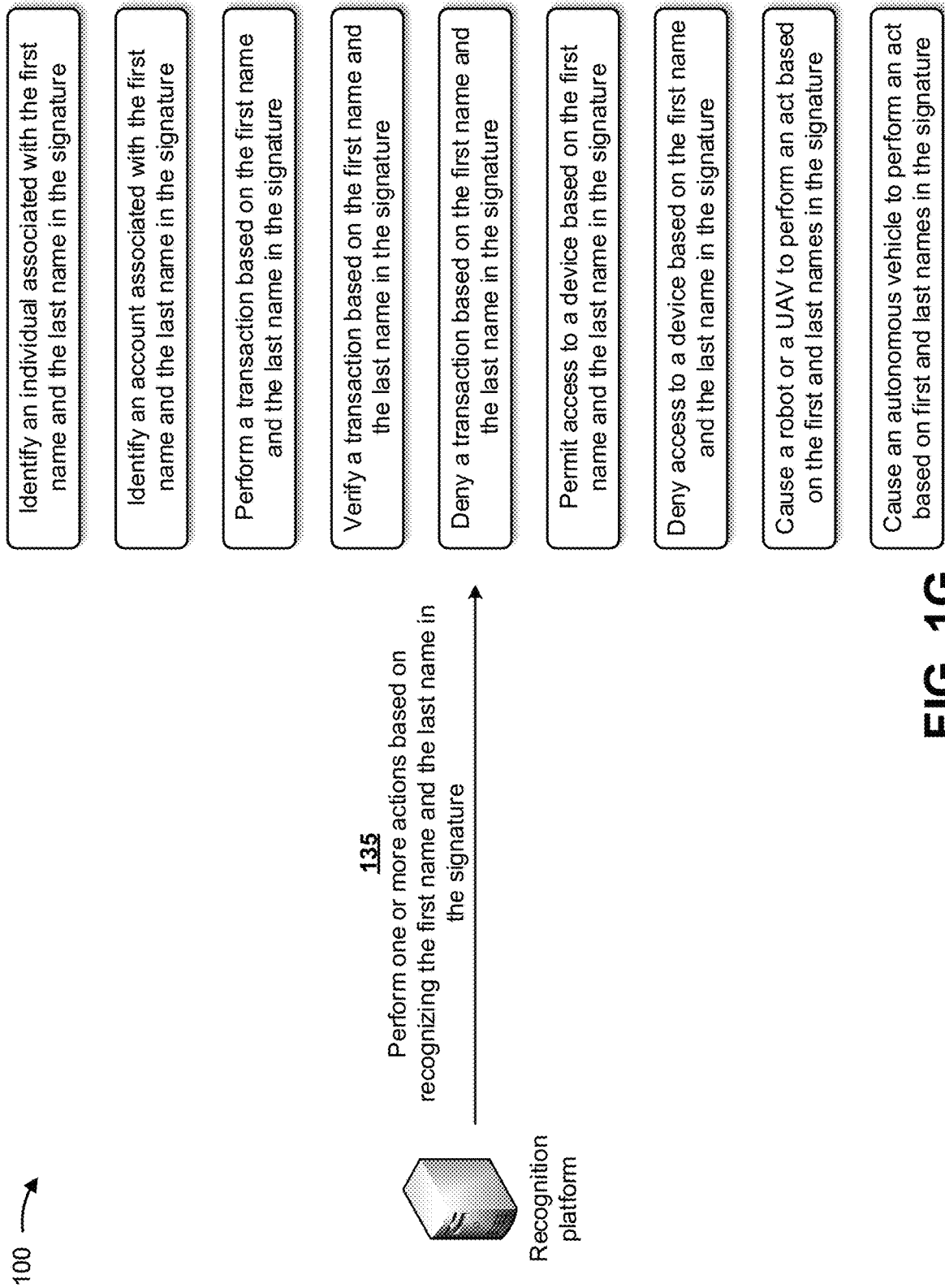

As shown in FIG. 1G, and by reference number 135, the recognition platform may perform one or more actions based on recognizing the first name and the last name in the signature. For example, the one or more actions may include the recognition platform identifying an individual associated with the first name and the last name in the signature. In this way, the recognition platform may quickly identify the individual based on the image of the signature, which may conserve resources that would otherwise be wasted in attempting to identify the individual associated with the signature.

In some implementations, the one or more actions may include the recognition platform identifying an account associated with the first name and the last name in the signature. In this way, the recognition platform may quickly identify the account based on the image of the signature, which may conserve resources that would otherwise be wasted in attempting to identify the account associated with the first name and the last name in the signature.

In some implementations, the one or more actions may include the recognition platform performing a transaction based on recognition and verification of the first name and the last name in the signature. In this way, the recognition platform may verify the first name and the last name in the signature and may perform the transaction based on the verification, which may conserve resources that would otherwise be wasted in attempting to verify the individual associated with the signature.

In some implementations, the one or more actions may include the recognition platform denying a transaction based on a failure to recognize the first name and the last name in the signature. In this way, the recognition platform may conserve resources (e.g., processing resources, memory resources, network resources, and/or the like) associated with unnecessarily processing a transaction.

In some implementations, the one or more actions may include the recognition platform permitting access to a device based on recognition and verification of the first name and the last name in the signature. For example, the recognition platform may permit the individual to access an automatic teller machine (e.g., to withdraw cash) based on recognition and verification of the first name and the last name in the signature. In this way, the recognition platform may provide a secure mechanism for accessing a device such as an automatic teller machine.

In some implementations, the one or more actions may include the recognition platform denying access to a device based on the first name and the last name in the signature. For example, the recognition platform may deny the individual access to an automatic teller machine (e.g., to withdraw cash) based on recognition and verification of the first name and the last name in the signature. In this way, the recognition platform may provide a secure mechanism for preventing access to a device, such as an automatic teller machine, by an unauthorized individual.

In some implementations, the one or more actions may include the recognition platform causing a robot or an unmanned aerial vehicle (UAV) to perform an act based on the first name and the last name in the signature. For example, the recognition platform may require user authorization before permitting a user to control the robot or the UAV. In this way, the recognition platform may provide a secure mechanism for controlling a robot or a UAV.

In some implementations, the one or more actions may include the recognition platform causing an autonomous vehicle to perform an act based on the first name and the last name in the signature. For example, the recognition platform may require user authorization before permitting a user to control the autonomous vehicle. In this way, the recognition platform may provide a secure mechanism for controlling an autonomous vehicle.

In some implementations, the recognition platform may receive, from another source, a neural network model that was previously trained to recognize a first name and a second name from a handwritten signature. In such implementations, the neural network model may be previously trained by applying different cursive fonts to each first name, of a plurality of first names, and to each second name, of a plurality of second names, to generate images of different cursive first names and images of different cursive second names; applying different transformations to the images of the different cursive first names to generate a set of first name images; applying the different transformations to the images of the different cursive second names to generate a set of second name images; combining each first name image of the set of first name images with each second name image of the set of second name images to form a set of full name images, wherein each full name image of the set of full name images includes one first name image of the set of first name images and one second name image of the set of second name images; and training the neural network model with the set of full name images.

In this way, several different stages of the process for training a neural network model for recognizing handwritten signatures are automated based on different cursive fonts and transformations, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that trains a neural network model for recognizing handwritten signatures based on different cursive fonts and transformations. Finally, automating the process for training a neural network model for recognizing handwritten signatures conserves computing resources (e.g., processing resources, memory resources, and/or the like) that would otherwise be wasted in less effectively attempting to train a neural network model for recognizing handwritten signatures.

As indicated above, FIGS. 1A-1G are provided merely as examples. Other examples may differ from what is described with regard to FIGS. 1A-1G.

Figure 2:
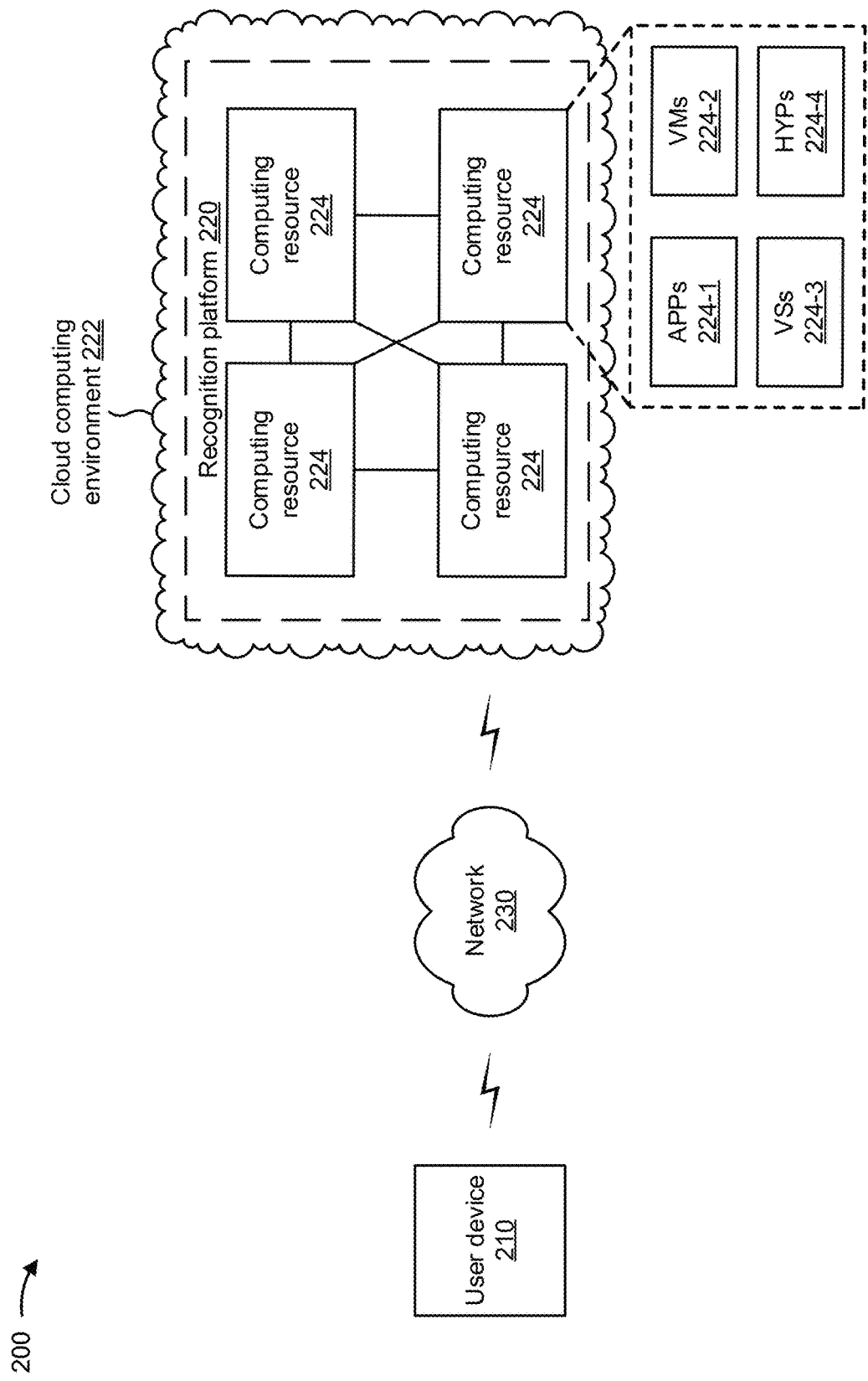
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a recognition platform 220, and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to recognition platform 220.

Recognition platform 220 includes one or more devices that train a neural network model for recognizing handwritten signatures based on different cursive fonts and transformations. In some implementations, recognition platform 220 may be designed to be modular such that certain software components may be swapped in or out depending on a particular need. As such, recognition platform 220 may be easily and/or quickly reconfigured for different uses. In some implementations, recognition platform 220 may receive information from and/or transmit information to one or more user devices 210.

In some implementations, as shown, recognition platform 220 may be hosted in a cloud computing environment 222. Notably, while some implementations of recognition platform 220 are described herein as being hosted in cloud computing environment 222, in other implementations recognition platform 220 may be non-cloud-based (i.e., may be implemented outside of a cloud computing environment) or may be partially cloud-based.

Cloud computing environment 222 includes an environment that hosts recognition platform 220. Cloud computing environment 222 may provide computation, software, data access, storage, etc. services that do not require end-user knowledge of a physical location and configuration of system(s) and/or device(s) that host recognition platform 220. As shown, cloud computing environment 222 may include a group of computing resources 224 (referred to collectively as "computing resources 224" and individually as "computing resource 224").

Computing resource 224 includes one or more personal computers, workstation computers, server devices, and/or other types of computation and/or communication devices. In some implementations, computing resource 224 may host recognition platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with recognition platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of user device 210 or an operator of recognition platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
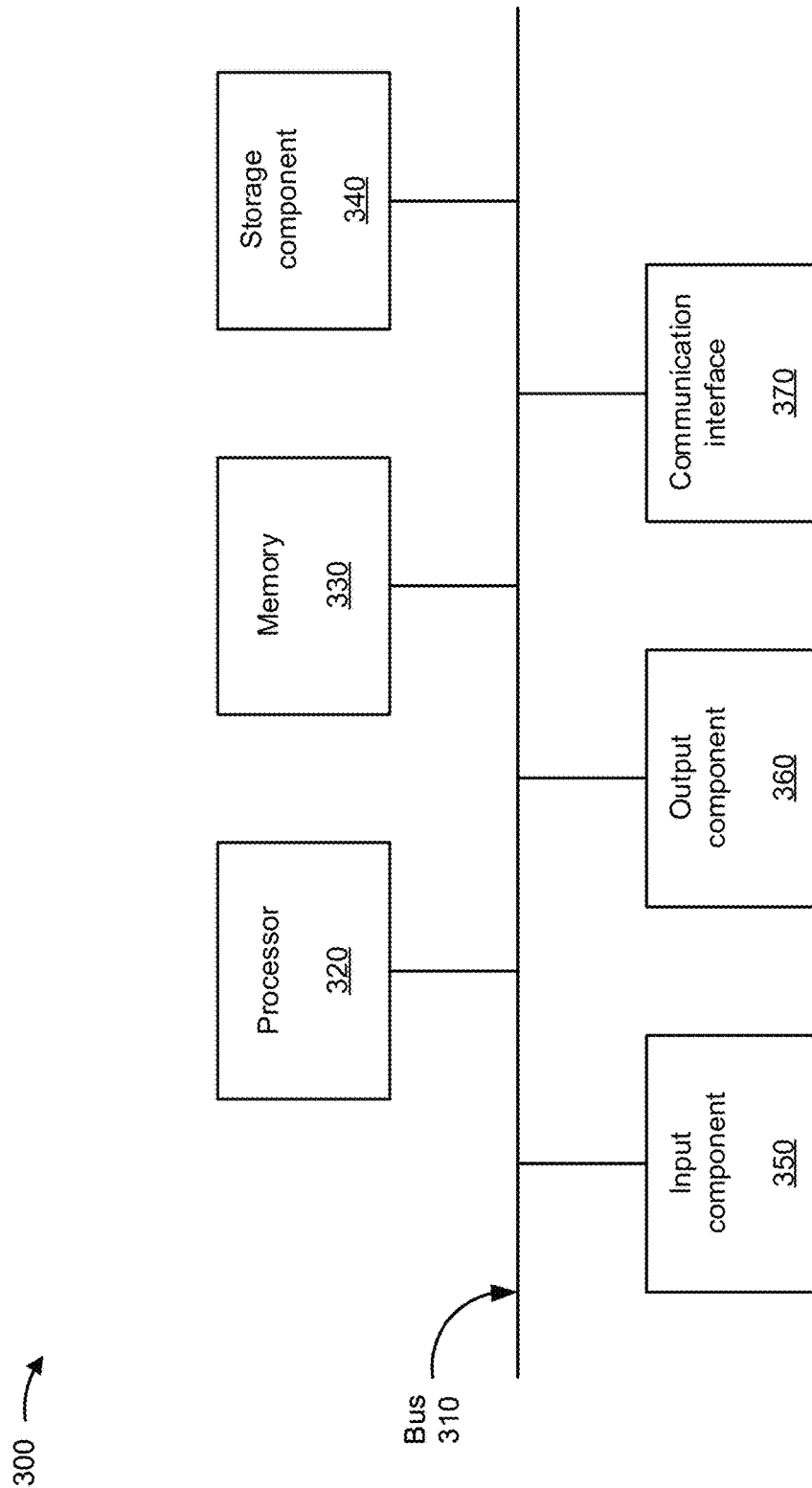
FIG. 3 is a diagram of example components of one or more devices of FIG. 2.

FIG. 3 is a diagram of example components of a device 300. Device 300 may correspond to user device 210, recognition platform 220, and/or computing resource 224. In some implementations, user device 210, recognition platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
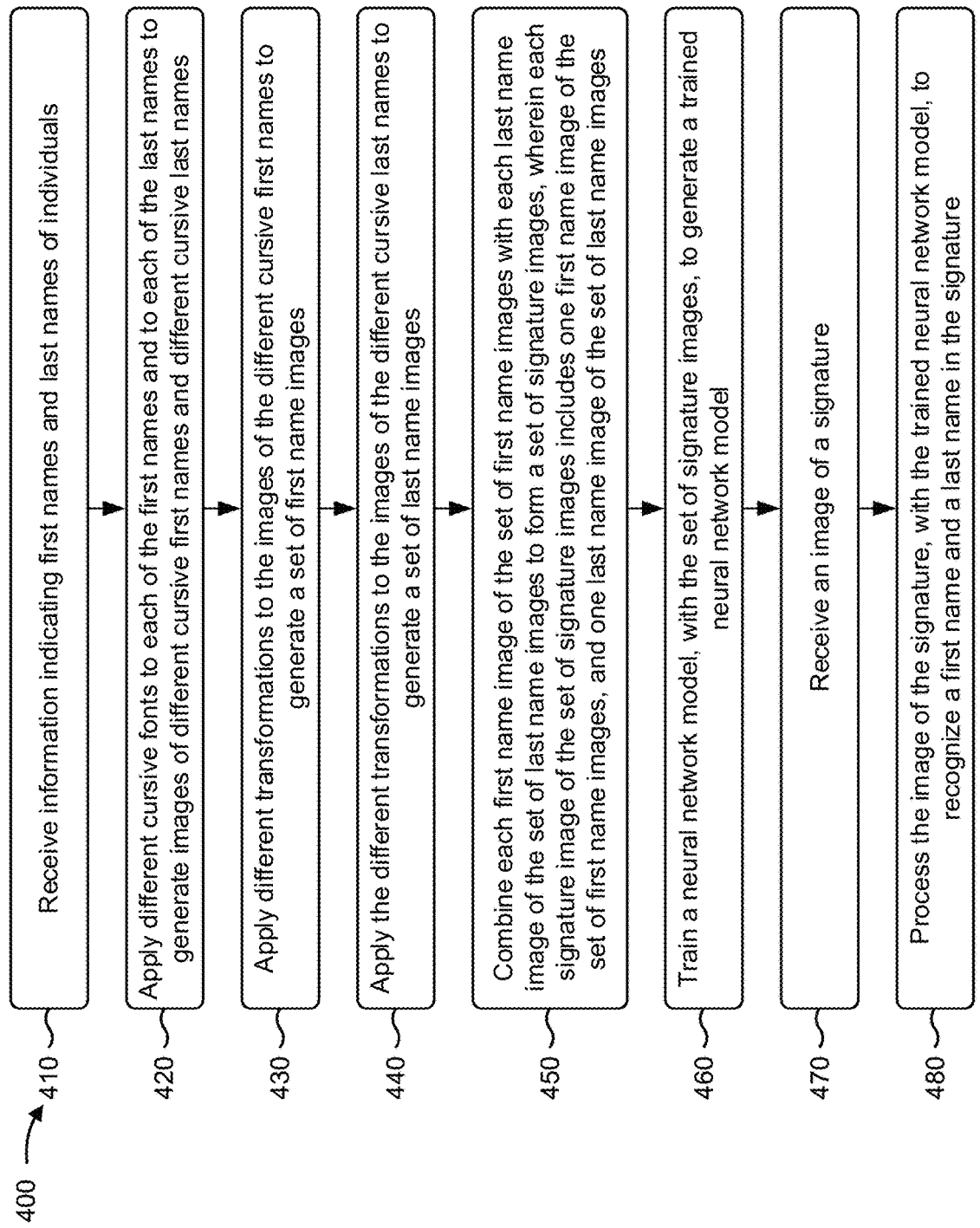
FIGS. 4-6 are flow charts of example processes for training a neural network model for recognizing handwritten signatures based on different cursive fonts and transformations.

FIG. 4 is a flow chart of an example process 400 for training a neural network model for recognizing handwritten signatures based on different cursive fonts and transformations. In some implementations, one or more process blocks of FIG. 4 may be performed by a recognition platform (e.g., recognition platform 220). In some implementations, one or more process blocks of FIG. 4 may be performed by another device or a group of devices separate from or including the recognition platform, such as a user device (e.g., user device 210).

As shown in FIG. 4, process 400 may include receiving information indicating first names and last names of individuals (block 410). For example, the recognition platform (e.g., using computing resource 224, processor 320, communication interface 370, and/or the like) may receive information indicating first names and last names of individuals, as described above in connection with FIGS. 1A-2.

As further shown in FIG. 4, process 400 may include applying different cursive fonts to each of the first names and to each of the last names to generate images of different cursive first names and different cursive last names (block 420). For example, the recognition platform (e.g., using computing resource 224, processor 320, memory 330, and/or the like) may apply different cursive fonts to each of the first names and to each of the last names to generate images of different cursive first names and different cursive last names, as described above in connection with FIGS. 1A-2.

As further shown in FIG. 4, process 400 may include applying different transformations to the images of the different cursive first names to generate a set of first name images (block 430). For example, the recognition platform (e.g., using computing resource 224, processor 320, storage component 340, and/or the like) may apply different transformations to the images of the different cursive first names to generate a set of first name images, as described above in connection with FIGS. 1A-2.

As further shown in FIG. 4, process 400 may include applying the different transformations to the images of the different cursive last names to generate a set of last name images (block 440). For example, the recognition platform (e.g., using computing resource 224, processor 320, memory 330, and/or the like) may apply the different transformations to the images of the different cursive last names to generate a set of last name images, as described above in connection with FIGS. 1A-2.

As further shown in FIG. 4, process 400 may include combining each first name image of the set of first name images with each last name image of the set of last name images to form a set of signature images, wherein each signature image of the set of signature images includes one first name image of the set of first name images, and one last name image of the set of last name images (block 450). For example, the recognition platform (e.g., using computing resource 224, processor 320, storage component 340, and/or the like) may combine each first name image of the set of first name images with each last name image of the set of last name images to form a set of signature images, as described above in connection with FIGS. 1A-2. In some implementations, each signature image of the set of signature images may include one first name image of the set of first name images, and one last name image of the set of last name images.

As further shown in FIG. 4, process 400 may include training a neural network model, with the set of signature images, in order to generate a trained neural network model (block 460). For example, the recognition platform (e.g., using computing resource 224, processor 320, memory 330, and/or the like) may train a neural network model, with the set of signature images, in order to generate a trained neural network model, as described above in connection with FIGS. 1A-2.

As further shown in FIG. 4, process 400 may include receiving an image of a signature (block 470). For example, the recognition platform (e.g., using computing resource 224, processor 320, communication interface 370, and/or the like) may receive an image of a signature, as described above in connection with FIGS. 1A-2.

As further shown in FIG. 4, process 400 may include processing the image of the signature, with the trained neural network model, to recognize a first name and a last name in the signature (block 480). For example, the recognition platform (e.g., using computing resource 224, processor 320, memory 330, and/or the like) may process the image of the signature, with the trained neural network model, to recognize a first name and a last name in the signature, as described above in connection with FIGS. 1A-2.

Process 400 may include additional implementations, such as any single implementation or any combination of implementations described below and/or described with regard to any other process described herein.

In some implementations, the recognition platform may perform one or more actions based on recognizing the first name and the last name in the signature. In some implementations, when performing the one or more actions, the recognition platform may identify an individual associated with the first name and the last name in the signature, may identify an account associated with the first name and the last name in the signature, may perform a transaction based on the first name and the last name in the signature, may verify a transaction based on the first name and the last name in the signature, may deny a transaction based on the first name and the last name in the signature, may permit access to a server device based on the first name and the last name in the signature, may deny access to the server device based on the first name and the last name in the signature, may cause a robot or an unmanned aerial vehicle to perform an act based on the first name and the last name in the signature, and/or may cause an autonomous vehicle to perform an act based on the first name and the last name in the signature.

In some implementations, when applying the different transformations to the images of the different cursive first names, the recognition platform may stretch at least one of the images of the different cursive first names in a first direction, may stretch at least one of the images of the different cursive first names in a second direction that is opposite to the first direction, may enlarge a first character provided in at least one of the images of the different cursive first names, may modify spacing of characters in at least one of the images of the different cursive first names, may adjust a center character in at least one of the images of the different cursive first names, may modify an orientation of at least one of the images of the different cursive first names, and/or may modify an intensity of a last character in at least one of the images of the different cursive first names.

In some implementations, when applying the different transformations to the images of the different cursive last names, the recognition platform may stretch at least one of the images of the different cursive last names in a first direction, may stretch at least one of the images of the different cursive last names in a second direction that is opposite to the first direction, may enlarge a first character provided in at least one of the images of the different cursive last names, may modify spacing of characters in at least one of the images of the different cursive last names, may adjust a center character in at least one of the images of the different cursive last names, may modify an orientation of at least one of the images of the different cursive last names, or may modify an intensity of a last character in at least one of the images of the different cursive last names.

In some implementations, the neural network model may include a deep learning image classifier neural network model. In some implementations, the recognition platform may provide, to a user device, information identifying the first name and the last name in the signature.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
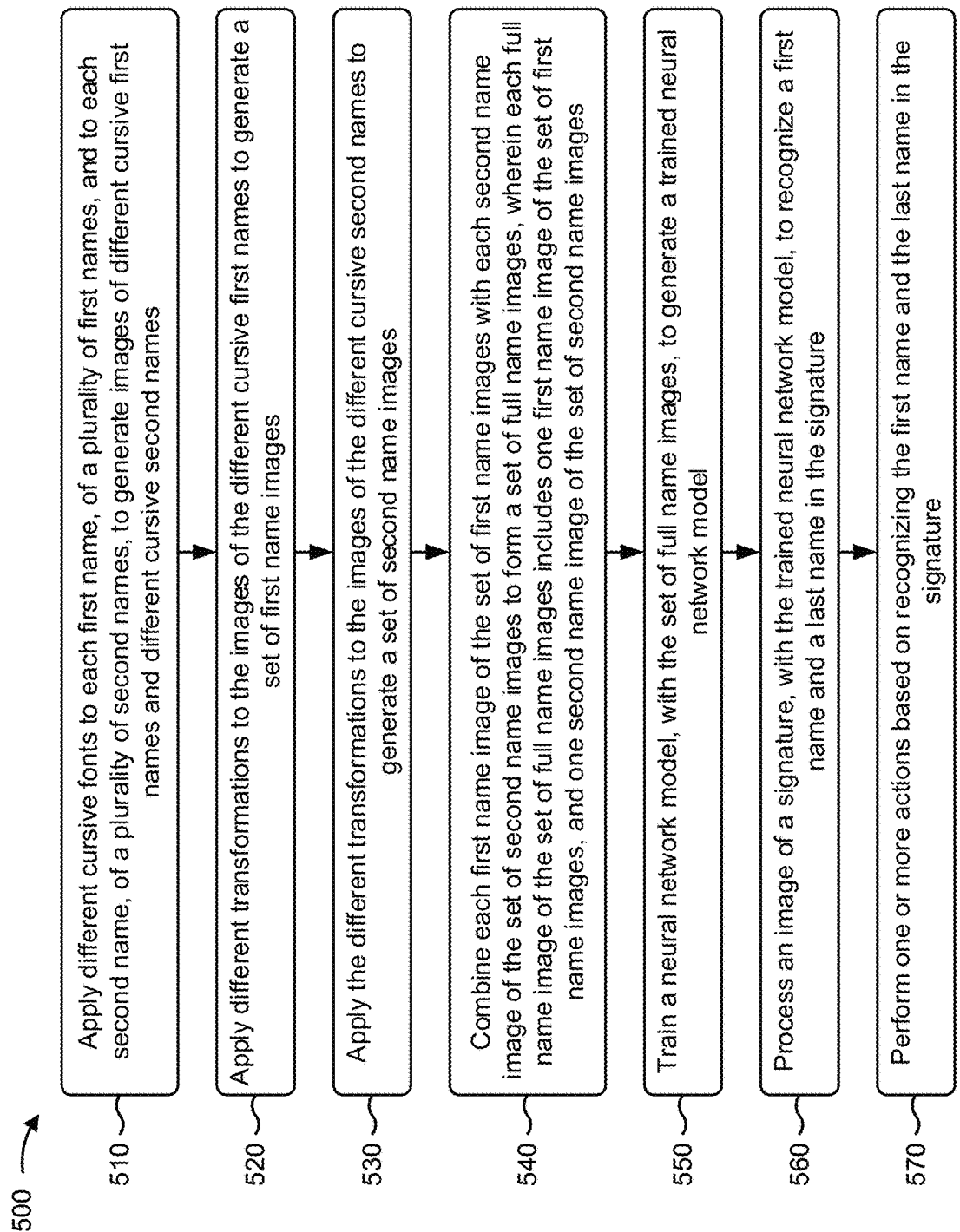

FIG. 5 is a flow chart of an example process 500 for training a neural network model for recognizing handwritten signatures based on different cursive fonts and transformations. In some implementations, one or more process blocks of FIG. 5 may be performed by a recognition platform (e.g., recognition platform 220). In some implementations, one or more process blocks of FIG. 5 may be performed by another device or a group of devices separate from or including the recognition platform, such as a user device (e.g., user device 210).

As shown in FIG. 5, process 500 may include applying different cursive fonts to each first name, of a plurality of first names, and to each second name, of a plurality of second names, to generate images of different cursive first names and different cursive second names (block 510). For example, the recognition platform (e.g., using computing resource 224, processor 320, memory 330, and/or the like) may apply different cursive fonts to each first name, of a plurality of first names, and to each second name, of a plurality of second names, to generate images of different cursive first names and different cursive second names, as described above in connection with FIGS. 1A-2.

As further shown in FIG. 5, process 500 may include applying different transformations to the images of the different cursive first names to generate a set of first name images (block 520). For example, the recognition platform (e.g., using computing resource 224, processor 320, storage component 340, and/or the like) may apply different transformations to the images of the different cursive first names to generate a set of first name images, as described above in connection with FIGS. 1A-2.

As further shown in FIG. 5, process 500 may include applying the different transformations to the images of the different cursive second names to generate a set of second name images (block 530). For example, the recognition platform (e.g., using computing resource 224, processor 320, memory 330, and/or the like) may apply the different transformations to the images of the different cursive second names to generate a set of second name images, as described above in connection with FIGS. 1A-2.

As further shown in FIG. 5, process 500 may include combining each first name image of the set of first name images with each second name image of the set of second name images to form a set of full name images, wherein each full name image of the set of full name images includes one first name image of the set of first name images, and one second name image of the set of second name images (block 540). For example, the recognition platform (e.g., using computing resource 224, processor 320, storage component 340, and/or the like) may combine each first name image of the set of first name images with each second name image of the set of second name images to form a set of full name images, as described above in connection with FIGS. 1A-2. In some implementations, each full name image of the set of full name images may include one first name image of the set of first name images, and one second name image of the set of second name images.

As further shown in FIG. 5, process 500 may include training a neural network model, with the set of full name images, in order to generate a trained neural network model (block 550). For example, the recognition platform (e.g., using computing resource 224, processor 320, memory 330, and/or the like) may train a neural network model, with the set of full name images, in order to generate a trained neural network model, as described above in connection with FIGS. 1A-2.

As further shown in FIG. 5, process 500 may include processing an image of a signature, with the trained neural network model, to recognize a first name and a last name in the signature (block 560). For example, the recognition platform (e.g., using computing resource 224, processor 320, storage component 340, and/or the like) may process an image of a signature, with the trained neural network model, to recognize a first name and a last name in the signature, as described above in connection with FIGS. 1A-2.

As further shown in FIG. 5, process 500 may include performing one or more actions based on recognizing the first name and the last name in the signature (block 570). For example, the recognition platform (e.g., using computing resource 224, processor 320, memory 330, communication interface 370, and/or the like) may perform one or more actions based on recognizing the first name and the last name in the signature, as described above in connection with FIGS. 1A-2.

Process 500 may include additional implementations, such as any single implementation or any combination of implementations described below and/or described with regard to any other process described herein.

In some implementations, when performing the one or more actions, the recognition platform may identify an individual associated with the first name and the last name in the signature, may identify an account associated with the first name and the last name in the signature, may perform or authorize a transaction based on the first name and the last name in the signature, may verify a transaction based on the first name and the last name in the signature, may deny a transaction based on the first name and the last name in the signature, may permit access to a server device based on the first name and the last name in the signature, may deny access to the server device based on the first name and the last name in the signature, may cause a robot or an unmanned aerial vehicle to perform an act based on the first name and the last name in the signature, and/or may cause an autonomous vehicle to perform an act based on the first name and the last name in the signature.

In some implementations, the recognition platform may receive, from the one or more memories, information identifying the plurality of first names and the plurality of second names. In some implementations, when applying the different transformations to the images of the different cursive first names, the recognition platform may stretch at least one of the images of the different cursive first names in a first direction, may stretch at least one of the images of the different cursive first names in a second direction that is opposite to the first direction, may enlarge a first character provided in at least one of the images of the different cursive first names, may modify spacing of characters in at least one of the images of the different cursive first names, may adjust a center character in at least one of the images of the different cursive first names, may modify an orientation of at least one of the images of the different cursive first names, and/or may modify an intensity of a last character in at least one of the images of the different cursive first names.

In some implementations, when applying the different transformations to the images of the different cursive second names, the recognition platform may stretch at least one of the images of the different cursive second names in a first direction, may stretch at least one of the images of the different cursive second names in a second direction that is opposite to the first direction, may enlarge a first character provided in at least one of the images of the different cursive second names, may modify spacing of characters in at least one of the images of the different cursive second names, may adjust a center character in at least one of the images of the different cursive second names, may modify an orientation of at least one of the images of the different cursive second names, and/or may modify an intensity of a last character in at least one of the images of the different cursive second names.

In some implementations, the image of the signature may include an image of a handwritten signature. In some implementations, the recognition platform may provide, for display, information identifying the first name and the last name in the signature.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
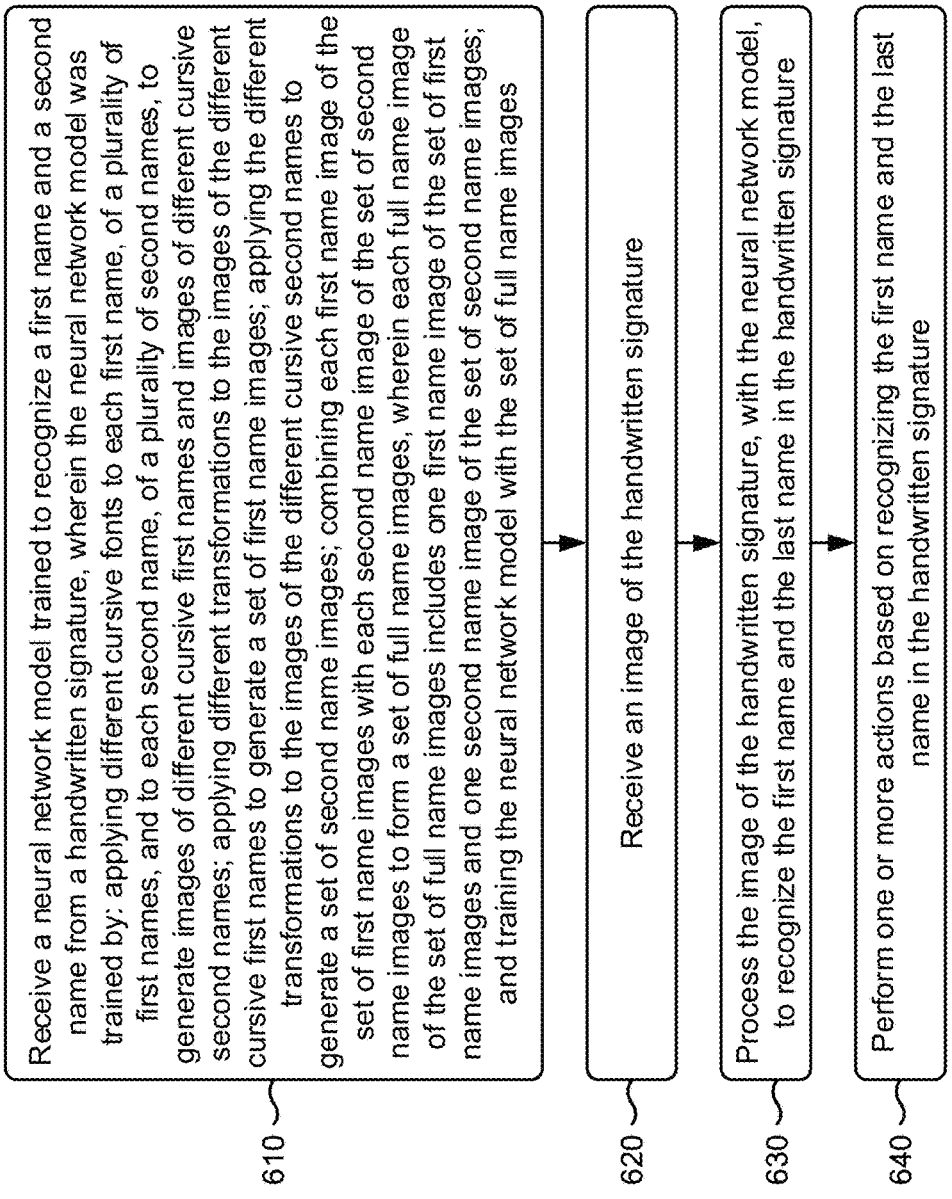

FIG. 6 is a flow chart of an example process 600 for training a neural network model for recognizing handwritten signatures based on different cursive fonts and transformations. In some implementations, one or more process blocks of FIG. 6 may be performed by a recognition platform (e.g., recognition platform 220). In some implementations, one or more process blocks of FIG. 6 may be performed by another device or a group of devices separate from or including the recognition platform, such as a user device (e.g., user device 210).

As shown in FIG. 6, process 600 may include receiving a neural network model trained to recognize a first name and a second name from a handwritten signature, wherein the neural network model was trained by applying different cursive fonts to each first name, of a plurality of first names, and to each second name, of a plurality of second names, to generate images of different cursive first names and images of different cursive second names, applying different transformations to the images of the different cursive first names to generate a set of first name images, applying the different transformations to the images of the different cursive second names to generate a set of second name images, combining each first name image of the set of first name images with each second name image of the set of second name images to form a set of full name images, wherein each full name image of the set of full name images includes one first name image of the set of first name images and one second name image of the set of second name images, and training the neural network model with the set of full name images (block 610). For example, the recognition platform (e.g., using computing resource 224, processor 320, communication interface 370, and/or the like) may receive a neural network model trained to recognize a first name and a second name from a handwritten signature, as described above in connection with FIGS. 1A-2. In some implementations, the neural network model may have been trained by applying different cursive fonts to each first name, of a plurality of first names, and by applying different cursive fonts to each second name, of a plurality of second names, to generate images of different cursive first names and images of different cursive second names, applying different transformations to the images of the different cursive first names to generate a set of first name images, applying the different transformations to the images of the different cursive second names to generate a set of second name images, combining each first name image of the set of first name images with each second name image of the set of second name images to form a set of full name images, wherein each full name image of the set of full name images includes one first name image of the set of first name images and one second name image of the set of second name images, and training the neural network model with the set of full name images.

As further shown in FIG. 6, process 600 may include receiving an image of the handwritten signature (block 620). For example, the recognition platform (e.g., using computing resource 224, processor 320, communication interface 370, and/or the like) may receive an image of the handwritten signature, as described above in connection with FIGS. 1A-2.

As further shown in FIG. 6, process 600 may include processing the image of the handwritten signature, with the neural network model, to recognize the first name and the last name in the handwritten signature (block 630). For example, the recognition platform (e.g., using computing resource 224, processor 320, memory 330, and/or the like) may process the image of the handwritten signature, with the neural network model, to recognize the first name and the last name in the handwritten signature, as described above in connection with FIGS. 1A-2.

As further shown in FIG. 6, process 600 may include performing one or more actions based on recognizing the first name and the last name in the handwritten signature (block 640). For example, the recognition platform (e.g., using computing resource 224, processor 320, storage component 340, communication interface 370, and/or the like) may perform one or more actions based on recognizing the first name and the last name in the handwritten signature, as described above in connection with FIGS. 1A-2.

Process 600 may include additional implementations, such as any single implementation or any combination of implementations described below and/or described with regard to any other process described herein.

In some implementations, when performing the one or more actions, the recognition platform may identify an individual associated with the first name and the last name in the handwritten signature, may identify an account associated with the first name and the last name in the handwritten signature, may perform a transaction based on the first name and the last name in the handwritten signature, may verify a transaction based on the first name and the last name in the handwritten signature, may deny a transaction based on the first name and the last name in the handwritten signature, may permit access to a server device based on the first name and the last name in the handwritten signature, may deny access to the server device based on the first name and the last name in the handwritten signature, may cause a robot or an unmanned aerial vehicle to perform an act based on the first name and the last name in the handwritten signature, and/or may cause an autonomous vehicle to perform an act based on the first name and the last name in the handwritten signature.

In some implementations, when applying the different transformations to the images of the different cursive first names, the recognition platform may stretch at least one of the images of the different cursive first names in a first direction, may stretch at least one of the images of the different cursive first names in a second direction that is opposite to the first direction, may enlarge a first character provided in at least one of the images of the different cursive first names, may modify spacing of characters in at least one of the images of the different cursive first names, may adjust a center character in at least one of the images of the different cursive first names, may modify an orientation of at least one of the images of the different cursive first names, and/or may modify an intensity of a last character in at least one of the images of the different cursive first names.

In some implementations, when applying the different transformations to the images of the different cursive second names, the recognition platform may stretch at least one of the images of the different cursive second names in a first direction, may stretch at least one of the images of the different cursive second names in a second direction that is opposite to the first direction, may enlarge a first character provided in at least one of the images of the different cursive second names, may modify spacing of characters in at least one of the images of the different cursive second names, may adjust a center character in at least one of the images of the different cursive second names, may modify an orientation of at least one of the images of the different cursive second names, and/or may modifying an intensity of a last character in at least one of the images of the different cursive second names.

In some implementations, the neural network model may include a deep learning image classifier neural network model. In some implementations, the recognition platform may provide, to a user device, information identifying the first name and the last name in the handwritten signature.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device, information indicating names of individuals;
applying, by the device, different cursive fonts to each of the names to generate images of different cursive names;
applying, by the device, transformations to the images of the different cursive names to generate a set of images,
wherein a transformation, of the transformations, transforms a straight line portion of contiguous characters of a name, of the different cursive names, to follow a curve rather than a straight line;
training, by the device, a neural network model, with the set of images, to generate a trained neural network model;
receiving, by the device, an image of a signature,
wherein the signature is associated with a name of the names;
permitting or denying access, by the device using the trained neural network model, to another device based on the name associated with the signature; and
performing a transaction based on permitting or denying access to the other device.

2. The method of claim 1, further comprising:
processing the image of the signature to recognize the name associated with the signature.

3. The method of claim 1, further comprising:
identifying an account associated with the name associated with the signature; and
wherein performing the transaction comprises:
denying the transaction based on the name associated with the signature.

4. The method of claim 1, wherein applying the transformations to the images of the different cursive names comprises:
adjusting a center character in at least one of the images of the different cursive names so that characters of another name, of the names, do not adhere to a straight line.

5. The method of claim 1, wherein applying the transformations to the images of the different cursive names comprises:
enlarging at least two characters provided in at least one of the images of the different cursive names in a trapezoidal shape in which the at least two characters of the name get increasingly larger from a left region of the name to a right region on the name.

6. The method of claim 1, wherein applying the transformations to the images of the different cursive names comprises:
modifying an orientation based on an angle of rotation of at least one of the images of the different cursive names.

7. The method of claim 1, wherein applying the transformations to the images of the different cursive names comprises:
modifying an intensity of a last character in at least one of the images of the different cursive names to mimic a fading signature.

8. A device, comprising:
one or more memories; and
one or more processors, communicatively coupled to the one or more memories, to:
receive information indicating names of individuals;
apply different cursive fonts to each of the names to generate images of different cursive names;
apply different transformations to the images of the different cursive names to generate a set of images,
wherein a transformation, of the different transformations, transforms a straight line portion of contiguous characters of a name, of the different cursive names, to follow a curve rather than a straight line;
train a neural network model, with the set of images, to generate a trained neural network model;
receive an image of a signature,
wherein the signature is associated with a name of the names;
permit or deny access, using the trained neural network model, to another device based on the name associated with the signature; and
perform a transaction based on permitting or denying access to the other device.

9. The device of claim 8, wherein the one or more processors are further to:
process the image of the signature to recognize the name associated with the signature.

10. The device of claim 8, wherein the one or more processors are further to:
cause a robot or an unmanned vehicle to perform an act based on the name associated with the signature.

11. The device of claim 8, wherein the one or more processors are further to:
provide information identifying the name associated with the signature.

12. The device of claim 8, wherein the curve is created synthetically by following an exponentially decayed sinusoidal curve.

13. The device of claim 8, wherein the one or more processors are further to:
process, using a deep learning image classifier neural network model, the image of the signature to recognize the name associated with the signature.

14. The device of claim 8, wherein the signature is a handwritten signature, and the one or more processors are further to:
verify that a user associated with the name associated with the signature is authorized to conduct a transaction.

15. A non-transitory computer-readable medium storing instructions, the instructions comprising:
one or more instructions that, when executed by one or more processors of a device, cause the one or more processors to:
receive information indicating names of individuals;
apply different cursive fonts to each of the names to generate images of different cursive names;
apply transformations to the images of the different cursive names to generate a set of images,
wherein a transformation, of the transformations, transforms a straight line portion of contiguous characters of a name, of the different cursive names, to follow a curve rather than a straight line;
train a neural network model, with the set of images, to generate a trained neural network model; receive an image of a signature,
wherein the signature is one of the names;

process the image of the signature to recognize a name in the signature;

permit or deny access, by the device and using the trained neural network model, to another device based on the name in the signature; and perform a transaction based on permitting or denying access to the other device.

16. The non-transitory computer-readable medium of claim 15, wherein the one or more instructions, further cause the one or more processors to:

identify an individual associated with the name in the signature; and wherein the one or more instructions, that cause the one or more processors to perform the transaction, cause the one or more processors to: deny the transaction based on the name in the signature.

17. The non-transitory computer-readable medium of claim 15, wherein the names of the individuals include a first name and a last name for each individual of the individuals.

18. The non-transitory computer-readable medium of claim 15, wherein the one or more instructions, further cause the one or more processors to:

provide information identifying the name in the signature.

19. The non-transitory computer-readable medium of claim 15, wherein the curve is generated with a midpoint on a lower edge of a character being aligned with a tangent of the curve at a tangent line for the character.

20. The non-transitory computer-readable medium of claim 15, wherein the signature is a handwritten signature, and the one or more processors are further to:

verify that a user associated with the name in the signature is authorized to conduct the transaction.

* * * * *